(12) United States Patent
Tang

(10) Patent No.: US 12,170,829 B1
(45) Date of Patent: Dec. 17, 2024

(54) VIDEO PROCESSING METHOD AND DEVICE, STORAGE MEDIUM AND PROGRAM PRODUCT

(71) Applicant: Beijing Zitiao Network Technology Co., Ltd., Beijing (CN)

(72) Inventor: Aini Tang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/393,179

(22) Filed: Dec. 21, 2023

Related U.S. Application Data

(63) Continuation of application No. PCT/CN2023/137491, filed on Dec. 8, 2023.

(30) Foreign Application Priority Data

Jul. 18, 2023 (CN) .......................... 202310883748.X

(51) Int. Cl.
  *H04N 21/845* (2011.01)
  *G11B 27/031* (2006.01)

(52) U.S. Cl.
  CPC ....... *H04N 21/8456* (2013.01); *G11B 27/031* (2013.01)

(58) Field of Classification Search
  CPC . G11B 27/031; G06F 3/04845; H04N 21/854; H04N 21/44016; H04N 21/47205
  See application file for complete search history.

(56) References Cited

U.S. PATENT DOCUMENTS

| | | | |
|---|---|---|---|
| 2005/0257152 A1* | 11/2005 | Shimizu | G11B 27/34 |
| 2013/0129316 A1* | 5/2013 | Dontcheva | G11B 27/34 |
| | | | 386/E9.011 |
| 2021/0042351 A1* | 2/2021 | Moore | G06F 16/75 |
| 2021/0264952 A1* | 8/2021 | Zhu | G06N 5/01 |
| 2022/0044026 A1* | 2/2022 | Huang | G11B 27/034 |
| 2022/0238139 A1 | 7/2022 | Zheng et al. | |

FOREIGN PATENT DOCUMENTS

| | | |
|---|---|---|
| CN | 113347465 A | 9/2021 |
| CN | 114268748 A | 4/2022 |
| CN | 115914496 A | 4/2023 |
| WO | 2022126664 A1 | 6/2022 |

* cited by examiner

*Primary Examiner* — Mishawn N. Hunter

(57) ABSTRACT

A video processing method and device, storage medium and program product are provided. The method includes: in response to a template editing operation triggered on a video editing interface, acquiring a video draft template indicated by the template editing operation and an initial video material, wherein an editing track is presented on the video editing interface, an initial video track clip formed based on the initial video material is presented on the editing track, the video draft template includes editing information, and the editing information is for indicating an editing operation for a video material to be filled; filling the initial video material in the video draft template to form a target video track clip, wherein the target video track clip is for presenting an editing effect obtained by editing the initial video material by means of editing processing; and presenting the target video track clip on the editing track.

18 Claims, 12 Drawing Sheets

VIDEO PROCESSING METHOD AND DEVICE, STORAGE MEDIUM AND PROGRAM PRODUCT

CROSS-REFERENCE TO RELATED APPLICATION(S)

This application is a U.S. National Stage Application of PCT Application Serial No. PCT/CN2023/137491, filed Dec. 8, 2023, which claims priority to Chinese Application No. 202111257767.9 filed in Oct. 27, 2021, the disclosures of which are incorporated herein by reference in their entities.

FIELD

Embodiments of the present disclosure relate to the technical field of computers, and in particular, to a video processing method and device, a storage medium and a program product.

BACKGROUND

It is increasingly becoming a trend to promote products or show oneself by publishing video works. The requirements of users for conveniently and quickly processing videos to create rich and interesting video works are also increasing.

In the related art, video processing may be performed by two operation tools of clipping and same-style clipping.

However, the inventor discovers that at least the following technical problems exist in the related art: when the two operation tools are used at the same time, import and export need to be performed between the two tools, such that the operation is tedious, the efficiency is low, and the user experience is thus affected.

SUMMARY

Embodiments of the present disclosure provide a video processing method and device, a storage medium and a program product, so as to simplify the operation, improve the efficiency, and improve the user experience.

In a first aspect, an embodiment of the present disclosure provides a video processing method, including:

in response to a template editing operation triggered on a video editing interface, acquiring a video draft template indicated by the template editing operation and acquiring an initial video material, wherein an editing track is presented on the video editing interface, an initial video track clip formed based on the initial video material is presented on the editing track, the video draft template at least includes editing information, and the editing information is used for indicating an editing operation for a video material to be filled;

filling the initial video material in the video draft template to form a target video track clip, wherein the target video track clip is used for presenting an editing effect obtained by editing the initial video material by applying editing processing corresponding to the editing operation to the initial video; and presenting the target video track clip on the editing track.

In a second aspect, an embodiment of the present disclosure provides a video processing device, including:

an acquisition module, configured to: in response to a template editing operation triggered on a video editing interface, acquire a video draft template indicated by the template editing operation and acquire an initial video material, wherein an editing track is presented on the video editing interface, an initial video track clip formed based on the initial video material is presented on the editing track, the video draft template at least includes editing information, and the editing information is used for indicating an editing operation for a video material to be filled;

a filling module, configured to fill the initial video material in the video draft template to form a target video track clip, wherein the target video track clip is used for presenting an editing effect obtained by editing the initial video material by applying editing processing corresponding to the editing operation to the initial video; and a display module, configured to present the target video track clip on the editing track.

In a third aspect, an embodiment of the present disclosure provides an electronic device, including: a processor and a memory;

the memory stores a computer-executable instruction; and the processor executes the computer-executable instruction stored in the memory, so that the at least one processor executes the video processing method in the first aspect and various possible designs in the first aspect.

In a fourth aspect, an embodiment of the present disclosure provides a computer-readable storage medium, wherein a computer-executable instruction is stored in the computer-readable storage medium, and when executing the computer-executable instruction, a processor implements the video processing method in the first aspect and various possible designs in the first aspect.

In a fifth aspect, an embodiment of the present disclosure provides a computer program product, including a computer program, wherein when executed by a processor, the computer program implements the video processing method in the first aspect and various possible designs in the first aspect.

According to the video processing method and device, the storage medium and the program product provided in the present embodiment, the method includes: in response to a template editing operation triggered on a video editing interface, acquiring a video draft template indicated by the template editing operation and acquiring an initial video material, wherein an editing track is presented on the video editing interface, an initial video track clip formed based on the initial video material is presented on the editing track, the video draft template at least includes editing information, and the editing information is used for indicating an editing operation for a video material to be filled; filling the initial video material in the video draft template to form a target video track clip, wherein the target video track clip is used for presenting an editing effect obtained by editing the initial video material by applying editing processing corresponding to the editing operation to the initial video; and presenting the target video track clip on the editing track. The method provided in the embodiments of the present disclosure is simple to operate, and can improve the video processing efficiency, thereby improving the user experience.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

DETAILED DESCRIPTION OF EMBODIMENTS

Figure 1:
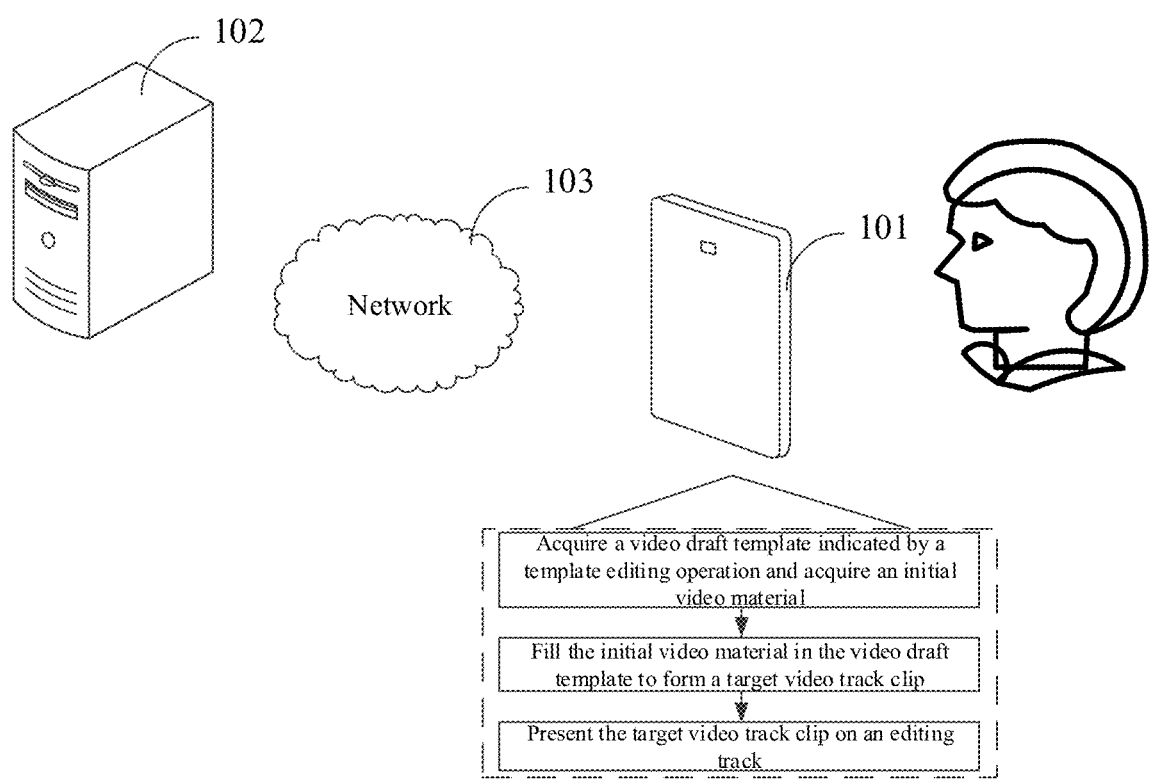
FIG. 1 is a schematic diagram of an application scenario of a video processing method provided in an embodiment of the present disclosure.

In order to make the objectives, technical solutions and advantages of the embodiments of the present disclosure clearer, a clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

It is increasingly becoming a trend to promote products or show oneself by publishing video works. The requirements of users for conveniently and quickly processing videos to create rich and interesting video works are also increasing.

In the related art, clipping and same-style clipping are two important operation tools for video processing, wherein clipping refers to that a user edits an initial video material on different tracks such as audio, character, sticker, picture-in-picture, and the like, so as to finally generate a video draft with richer and more interesting content, and the user exports and publishes the video draft. The same-style clipping refers to automatically applying the style of a video template (e.g., a video work published by others or himself/herself) to the initial video material of a user, wherein the video template generally includes a plurality of clips, the duration of each clip is fixed, operations such as text editing, video replacement, music volume and the like for each clip are supported, so that a same-style clipping draft is generated to export and publish the same.

However, the two operation tools are usually two independent function options which are set side by side in video processing software. If the user needs to use clipping and same-style clipping at the same time, the user needs to export and import the two tools, for example, some users first use the same-style clipping tool to apply the same template every day, so as to export a video, and then import the video into the clipping tool. The above video processing mode is cumbersome in operation, such that the video processing efficiency is relatively low, and the user experience is thus affected.

In order to solve the above technical problems, the inventor of the present disclosure discovers after researches that an entry label of same-style clipping may be set in a video editing interface, a video draft template is determined via the entry label, and then the video draft template is applied to a video material that is loaded into an initial video track clip of the video editing interface, so that the same-style clipping operation can be efficiently and conveniently performed in the video editing interface without importing and exporting between the two tools of clipping and same-style clipping, therefore the operation is simple, the video processing efficiency can be improved, and the user experience is thus improved. Based on this, an embodiment of the present disclosure provides a video processing method.

FIG. 1 is a schematic diagram of an application scenario of a video processing method provided in an embodiment of the present disclosure. As shown in FIG. 1, a terminal device 101 is in communication connection with a server 102 by means of a network 103. The terminal device 101 may be an electronic device provided with a display screen, such as a computer, a tablet device, a smartphone, and the like, and the network 103 may be a wired communication network, a wireless communication network, or the like.

In a specific implementation process, a terminal device is installed with a client of video processing software; in response to a touch operation of a user, the terminal device starts the client, displays a video editing interface, and in response to a template editing operation triggered on the video editing interface, acquires a video draft template indicated by the template editing operation and acquires an initial video track clip, wherein an editing track is presented on the video editing interface, an initial video track clip formed based on the initial video material is presented on the editing track, the video draft template at least includes editing information, the editing information is used for indicating an editing operation for a video material to be filled; and the initial video material is filled in the video draft template to form a target video track clip, wherein the target video track clip is used for presenting an editing effect obtained by editing the initial video material by applying editing processing corresponding to the editing operation to the initial video, and the target video track clip is presented on the editing track. According to the video processing method provided in the embodiment of the present disclosure, by means of determining the video draft template on the video editing interface, and applying the video draft template to the video material in the initial video track clip, a same-style clipping operation can be conveniently performed in the video editing interface without importing and exporting between the two tools of clipping and same-style clipping, so that the operation is simple, the video processing efficiency can be improved, and the user experience is thus improved.

It should be noted that, the schematic diagram of the scenario shown in FIG. 1 is merely an example, the video processing method and scenario described in the embodiments of the present application are intended to illustrate the technical solutions of the embodiments of the present application more clearly, and are not intended to limit the technical solutions provided in the embodiments of the present application. Those ordinary skilled in the art may know that, with the evolution of the system and the occurrence of a new service scenario, the technical solutions provided in the embodiments of the present application are also applicable to similar technical problems.

Figure 2:
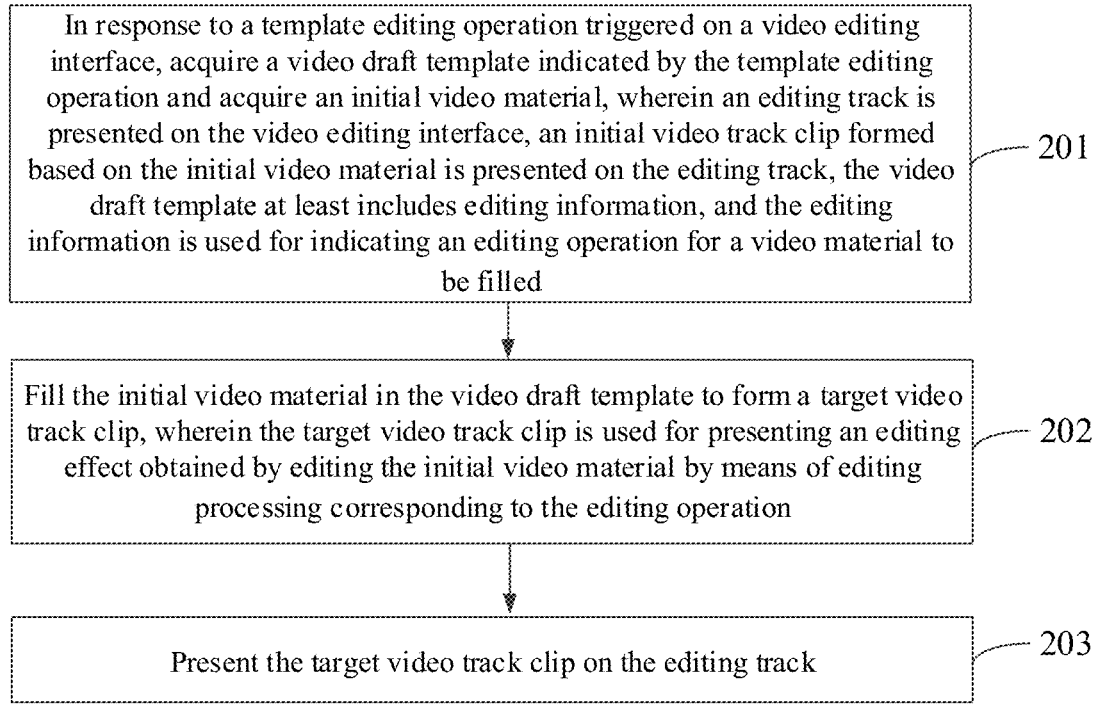
FIG. 2 is a first schematic flowchart of a video processing method provided in an embodiment of the present disclosure.

FIG. 2 is a first schematic flowchart of a video processing method provided in an embodiment of the present disclosure. The method in the present embodiment may be applied to a terminal device, and the video processing method includes:

201: In response to a template editing operation triggered on a video editing interface, acquiring a video draft template indicated by the template editing operation and acquiring an initial video material, wherein an editing track is presented on the video editing interface, an initial video track clip formed based on the initial video material is presented on the editing track, the video draft template at least includes editing information, and the editing information is used for indicating an editing operation for a video material to be filled.

Specifically, the initial video material may be added into the editing track of a multi-track editor in the video editing interface, so as to form the initial video track clip. Optionally, after being added into the editing track, the initial video material in the initial video track clip may be added, deleted, modified, and the like, so as to obtain the initial video track clip.

The initial video material may be a video stored in an album of the terminal device, a material collected in the cloud, or a material in a material library, etc. The initial video material may be one or more video clips or pictures.

Specifically, an entry label of the template may be set on the video editing interface, and a selection interface of the template is entered via the entry label, so as to determine the video draft template.

In one embodiment of the present disclosure, in response to the template editing operation triggered on the video editing interface, acquiring the video draft template indicated by the template editing operation, may include: in response to a touch operation acting on a first entry label in the video editing interface, displaying a template panel, wherein the template panel includes a plurality of templates to be selected; and in response to a touch operation acting on the plurality of templates to be selected, selecting the video draft template from the plurality of templates to be selected.

Figure 3A:
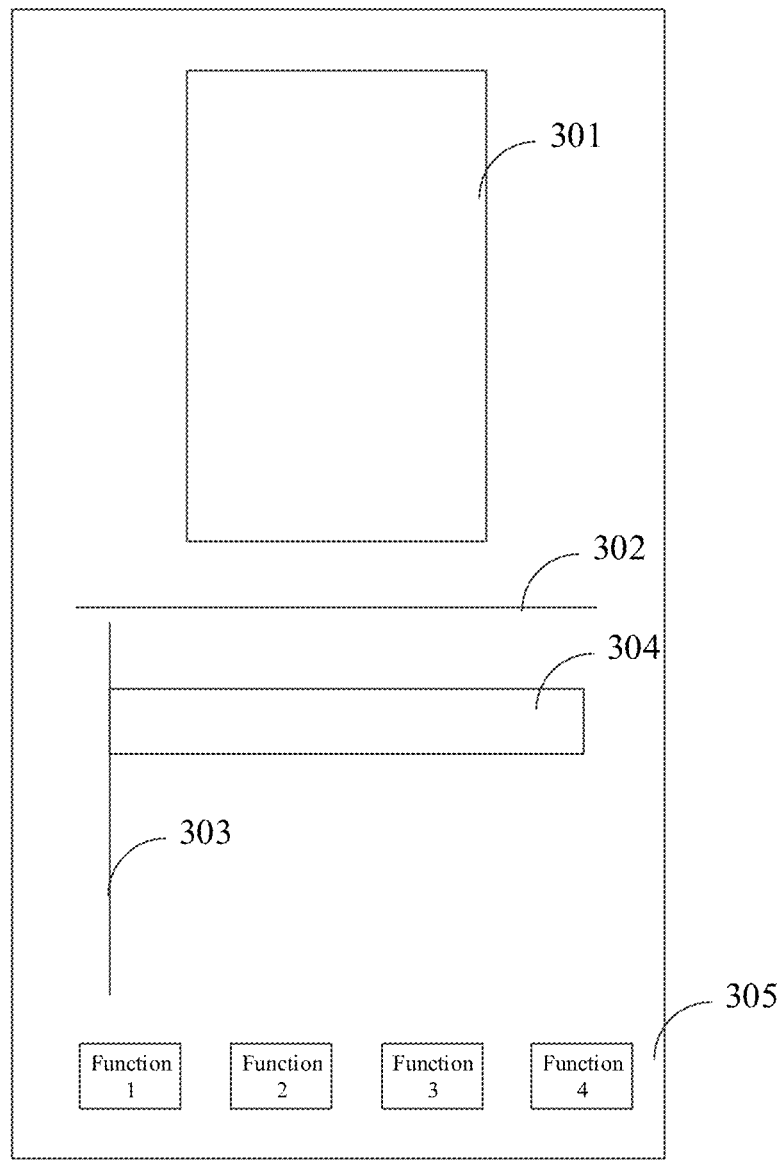
FIG. 3a is a first schematic diagram of a video editing interface provided in an embodiment of the present disclosure.
Figure 3B:
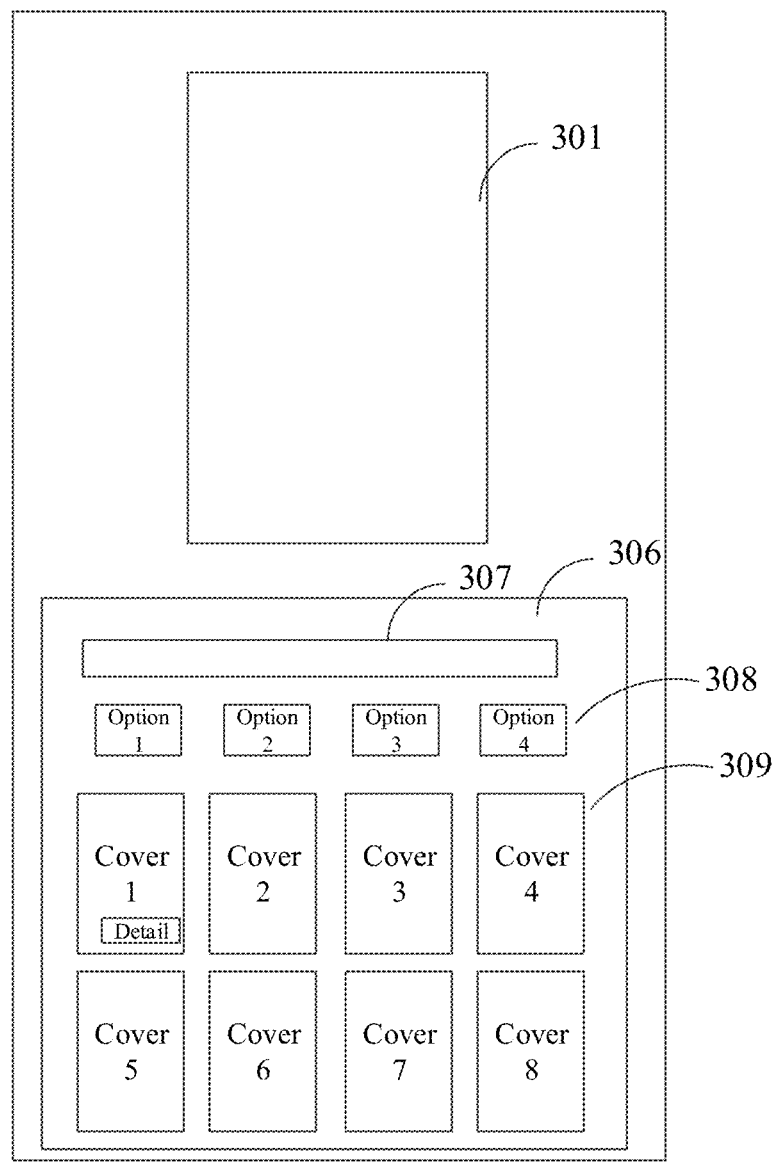
FIG. 3b is a second schematic diagram of a video editing interface provided in an embodiment of the present disclosure.

Exemplarily, as shown in FIG. 3a, the video editing interface may include, from top to bottom, a preview area 301, a time axis 302, a pointer 303, an initial video track clip 304, a function area 305, and the like, and the function area 305 at the bottom end of the video editing interface may be provided with a plurality of function controls (Functions 1 to 4), which include a "template" control for displaying the template panel. Assuming that the Function 1 is a "template" control, then, by means of touching the Function 1, as shown in FIG. 3b, a template panel 306 may be displayed below the preview area 301, a search box 307, an option area 308 (Option 1 to Option 4, the options may include confirm, clear, template classification and the like) and a template cover 309 may be displayed in the template panel 306, and a template theme (not shown) may be displayed below the template cover.

In one embodiment of the present disclosure, the template panel may be configured to support pull-up and pull-down interaction. Specifically, after entering the template panel, the template panel is displayed at a default height, and the template may be pulled up by pulling up the template panel until to the upper top of the preview area, so as to hide a playback bar and an export bar. When the content under template classification does not exceed one screen, the template panel may also be pulled up. During slide down, a template list is first slid down to display the first row, and then is slid down until the panel is pulled down to the default height.

In one embodiment of the present disclosure, after the template panel is displayed, in response to a touch operation acting on a control corresponding to a collected item in the template panel, a template collected by a user may be displayed (specifically, it may be configured that the collected template may only be displayed after the user logs in), wherein the collection mode of the template may be set such that a template cover displayed in the template panel is touched(for example, the template cover is pressed for a long time), so as to collect the template.

In one embodiment of the present disclosure, a control corresponding to a detail entry may be set in the template cover (for example, the control may be set at the lower right corner of the template cover), in response to a touch operation acting on the control, a video template corresponding to the template cover may be played, a corresponding control may be set and used on a playback interface, and in response to a touch operation acting on the control, a corresponding template may be determined as the video draft template, so as to be applied to the video material.

In one embodiment of the present disclosure, a hotspot may be set on the template cover, and in response to a touch operation acting on the hotspot, a corresponding template may be determined as the video draft template, so as to be applied to the video material.

In one embodiment of the present disclosure, after the video draft template is selected in the template panel, in response to a touch operation acting on a control corresponding to a clearing option in the template panel, the selected video draft template may be cleared to re-select the video draft template.

202: Filling the initial video material in the video draft template to form a target video track clip, wherein the target video track clip is used for presenting an editing effect obtained by editing the initial video material by applying editing processing corresponding to the editing operation to the initial video.

Specifically, after the video draft template is selected, the video draft template may be applied to the video material. Specifically, at least one target clip may be selected from a plurality of clips in the video material, and the target clip is filled in a template slot position of the video draft template to obtain a corresponding target video draft, so as to form the target video track clip based on the target video draft, and the target video track clip is presented on the editing track. It should be noted that the current video material may be the initial video track clip, and may also be a material obtained by cropping the initial video material that is added into the initial video track clip.

In one embodiment of the present disclosure, filling the initial video material in the video draft template to form the target video track clip may include: filling the initial video material in the video draft template to obtain a target video draft, wherein the target video draft includes editing operation information of the initial video material; and forming the target video track clip based on the target video draft.

Specifically, during the process of filling the initial video material in the video draft template, a video draft containing the editing operation information may be obtained at first, and then the target video track clip may be generated based on the video draft.

In one embodiment of the present disclosure, forming the target video track clip based on the target video draft may include: filling the target video draft to obtain the target video track clip; or, performing synthesis processing on the target video draft to obtain a corresponding target video material, and filling the target video material to obtain the target video track clip.

Specifically, there are a plurality of modes for forming the target video track clip. In one implementation, after the initial video material is filled in the video draft template, a complete video draft may be obtained, and the video draft may be determined as the target video track clip; and in another implementation, after the initial video material is filled in the video draft template, a complete video draft may be obtained, the video draft may be synthesized into a new video material, and the new video material is determined as the target video track clip.

In one embodiment of the present disclosure, in order to improve the use flexibility of the user and facilitate the user to add his/her own subjective aesthetics, the user may select to apply the video draft template at which position. Specifically, selecting at least one target clip from the video material may include: acquiring the position where a pointer in the editing track is located; and determining at least one target clip from the initial video material according to the position where the pointer is located.

Specifically, after the video draft template is determined, a plurality of clips of the video material may be displayed, in response to a touch operation acting on the plurality of clips, at least one target clip is selected, and the target clip may also be selected by means of the pointer in the editing track. The pointer refers to a preview axis corresponding to the time axis, and the position of the pointer slides to a corresponding position on the editing track as the picture in a preview area is played to a certain position on the time axis.

In one embodiment of the present disclosure, in order to simplify the operation, determining at least one target clip from the initial video material according to the position where the pointer is located may include: determining, as target clips, a clip corresponding to the position where the pointer is located in the initial video material, as well as a subsequent clip. That is, after the pointer slides to a target position, the clips at the position and after the position may be selected as the target clips, and only one-time sliding is needed, so that the operation is convenient and fast.

In the embodiment of the present disclosure, there may be a plurality of modes for inserting the determined at least one target clip into at least one template slot position of the video draft template (the template slot position is used for indicating a fillable position of the video material to be filled in the video draft template). Firstly, in order to combine with the aesthetic appreciation of the user and to provide a selection opportunity for the user, manual insertion may be utilized, and in order to improve the operation efficiency, automatic insertion may also be utilized. Secondly, for the automatic insertion mode, in one implementation, the target clip may be randomly inserted into the template slot position. In another implementation, considering that the sequence of the clips in the video material is a subjective operation result of the user, in order to adapt to the aesthetic appreciation of the user to a greater extent, the target clips may be inserted in combination with the sequence of the target clips in the video material.

In one embodiment of the present disclosure, filling the at least one target clip in the video draft template may include: inserting the at least one target clip into at least one template slot position of the video draft template in a one-to-one correspondence mode according to the sequence of the at least one target clip in the initial video track clip and the sequence of the at least one template slot position in the video draft template, wherein the template slot position is used for indicating the fillable position of the video material to be filled in the video draft template.

Exemplarily, assuming that there are three target clips a, b and c in sequence, and there are three template slot positions A, B and C in sequence, then a may be inserted into A, b may be inserted into B, and c may be inserted into C, thereby achieving one-to-one correspondence insertion of the target clips and the template slot positions.

In one embodiment of the present disclosure, considering that the template slot position may have a certain specification requirement for the inserted clip, the judgement of a preset condition may thus be added to meet the specification requirement of the template slot position. Specifically, inserting the at least one target clip into the at least one template slot position of the video draft template in the one-to-one correspondence mode according to the sequence of the at least one target clip in the initial video track clip and the sequence of the at least one template slot position in the video draft template, may specifically include: if the current target clip to be processed and the current template slot position to be inserted meet a preset condition, inserting the current target clip to be processed into the current template slot position to be inserted; and if the current target clip to be processed and the current template slot position to be inserted do not meet the preset condition, and there is a next target clip to be processed, determining the next target clip to be processed as a new current target clip to be processed.

In one embodiment of the present disclosure, considering the limitation of the template slot position in terms of duration, if the current target clip to be processed and the current template slot position to be inserted meet the preset condition, inserting the current target clip to be processed into the current template slot position to be inserted, may include: acquiring a first duration of the current target clip to be processed and a second duration of the current template slot position to be inserted; and if the first duration is greater than or equal to the second duration, inserting the current target clip to be processed into the current template slot position to be inserted. Correspondingly, if the current target clip to be processed does not meet the preset condition corresponding to the current template slot position to be inserted, and there is the next target clip to be processed, determining the next target clip to be processed as the new current target clip to be processed, may include: if the first duration is less than the second duration, and there is the next target clip to be processed, determining the next target clip to be processed as the new current target clip to be processed.

In one embodiment of the present disclosure, considering that the number of the target clips may not match the number of the template slot positions, therefore in the case that there is just no remaining target clip or there are remaining target clips, after inserting the current target clip to be processed into the current template slot position to be inserted, the method may further include: if there is no next template slot position to be inserted, determining the target video draft according to the at least one template slot position of which the insertion is completed. Specifically, if there is no next template slot position to be inserted, it indicates that all template slot positions of the video draft template are fully filled, therefore the filled template slot positions can be determined as the target video draft, and the target video draft is added into the initial video track clip to be fused with the initial track material to obtain a new track material. If there is a next template slot position to be inserted, the next template slot position to be inserted may be determined as the new current template slot position to be inserted.

In one embodiment of the present disclosure, in the case that the number of target clips is insufficient, inserting the at least one target clip into the at least one template slot position of the video draft template in the one-to-one correspondence mode according to the sequence of the at least one target clip in the initial video track clip and the sequence of the at least one template slot position in the video draft template, may further include: if the current target clip to be processed does not meet the preset condition corresponding to the current template slot position to be inserted, and there is no next target clip to be processed, filling preset pictures in the current template slot position to be inserted and the remaining template slot positions to be inserted. Exemplarily, if the first duration is less than the second duration, and there is no next target clip to be processed, the next target clip to be processed is determined as the new current target clip to be processed.

An insertion strategy based on a clip duration is exemplarily described below in combination with FIG. 4 and FIG. 5.

Figure 4:
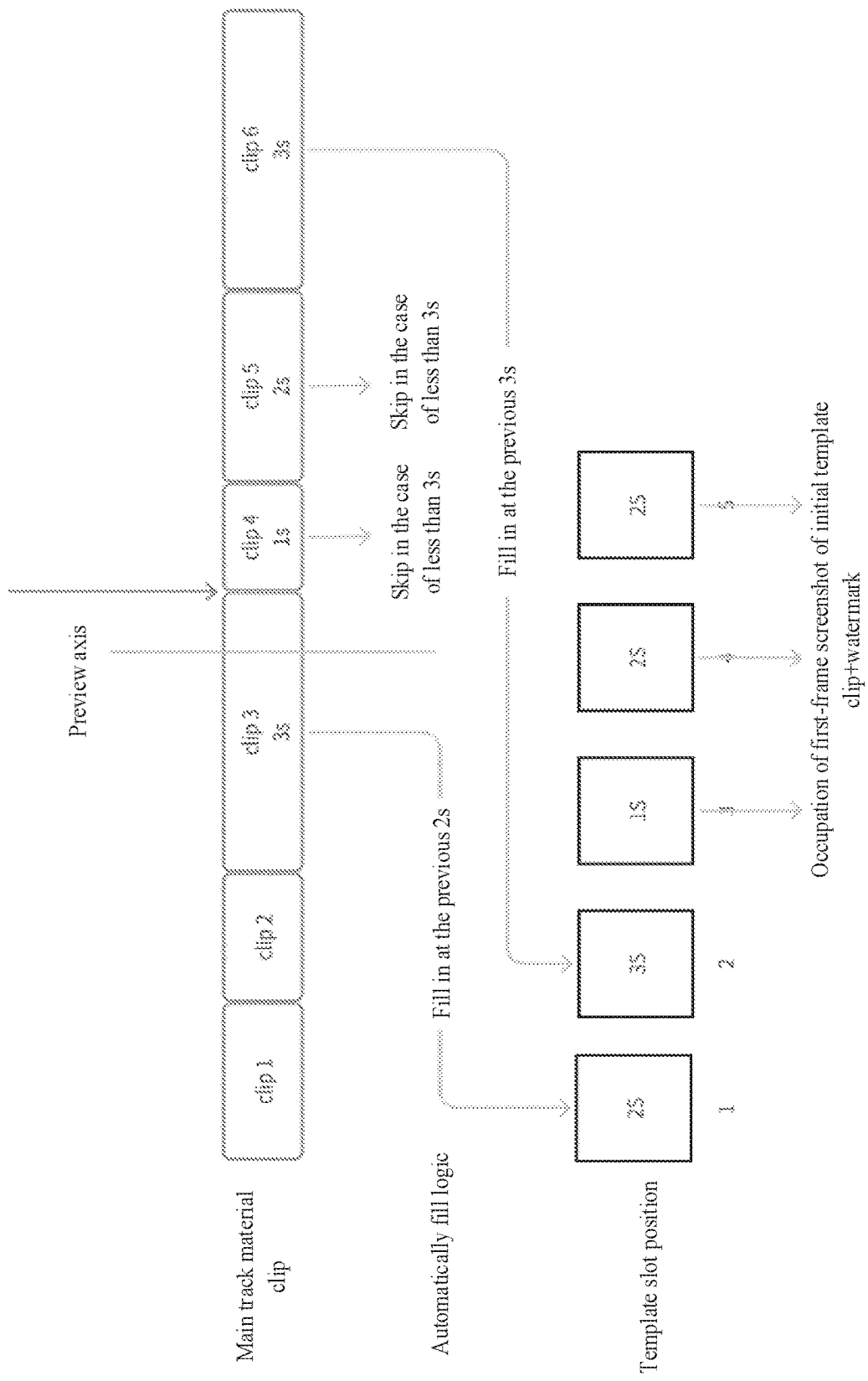
FIG. 4 is a first logic schematic diagram of inserting a target clip into a template slot position provided in an embodiment of the present disclosure.
Figure 5:
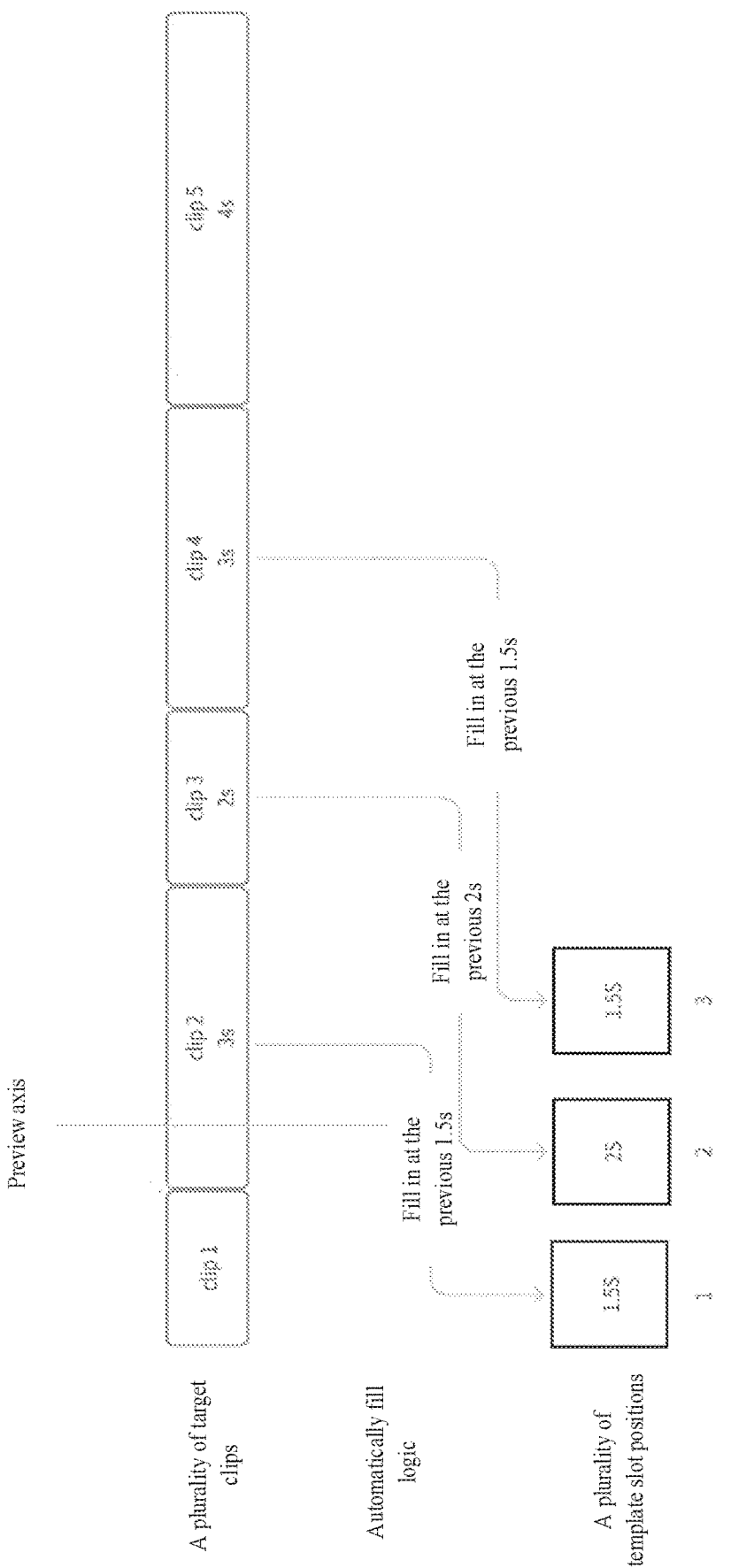
FIG. 5 is a first logic schematic diagram of inserting a target clip into a template slot position provided in an embodiment of the present disclosure.

As shown in FIG. 4, the number of target clips at the position where the pointer (the preview axis) is located and subsequent target clips meeting the requirement (the duration is greater than or equal to the duration required by the corresponding template slot position) is less than the number X of template slot positions, the target clips meeting the requirement are filled in the template slot positions in sequence, and the unfilled template slot positions may be filled with preset pictures (e.g., a first-frame screenshot of an initial template video). As shown in FIG. 5, the number of target clips at the position where the pointer (the preview axis) is located and subsequent target clips meeting the requirement is greater than or equal to the number X of template slot positions, the target clips are filled in the X template slot positions in sequence, and the remaining target clips are no longer filled.

In one embodiment of the present disclosure, the template slot positions of the video draft template include category attributes (different colors may be used to represent different categories, so that color point marks may be set on the template slot positions), and the same target clip may be filled in the template slot positions of the same category. Specifically, in one implementation, if the category of the current template slot position to be inserted is the same as that of a first template slot position of which the insertion has been completed, a first target clip inserted into the first template slot position is inserted into the current template slot position to be inserted, and the next template slot position to be inserted is determined as the current template slot position to be inserted. In another implementation, when a second target clip is inserted into the current template slot position to be inserted, it is detected whether a second template slot position having the same category as the current template slot position to be inserted is present in the remaining template slot positions to be inserted, if so, the second target clip is automatically inserted into the second template slot position at the same time. Exemplarily, assuming that A and C among the template slot positions A, B and C have the same category, and a meets the requirement of being inserted into A, then a may also be inserted into C.

In one embodiment of the present disclosure, after the target clip is inserted into the template slot position of the video draft template, the generated target video track clip may be edited, so as to add the edited target video track clip into the editing track.

Figure 6A:
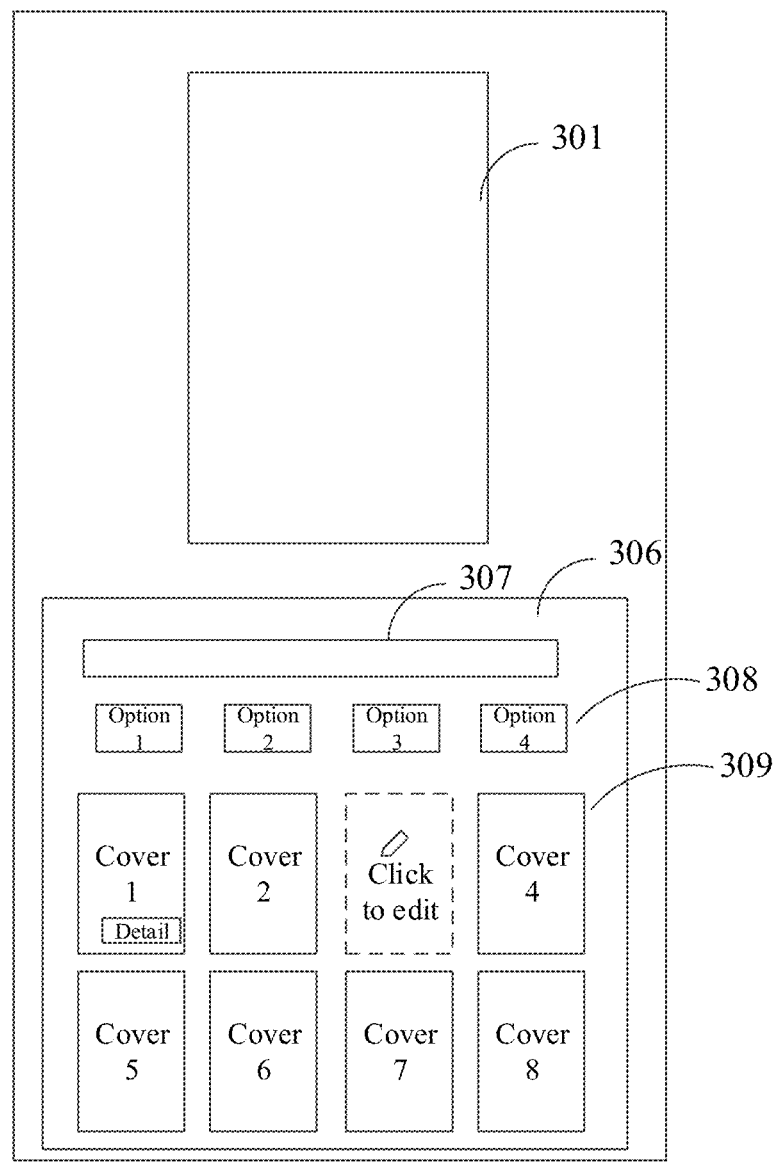
FIG. 6a is a third schematic diagram of a video editing interface provided in an embodiment of the present disclosure.
Figure 6B:
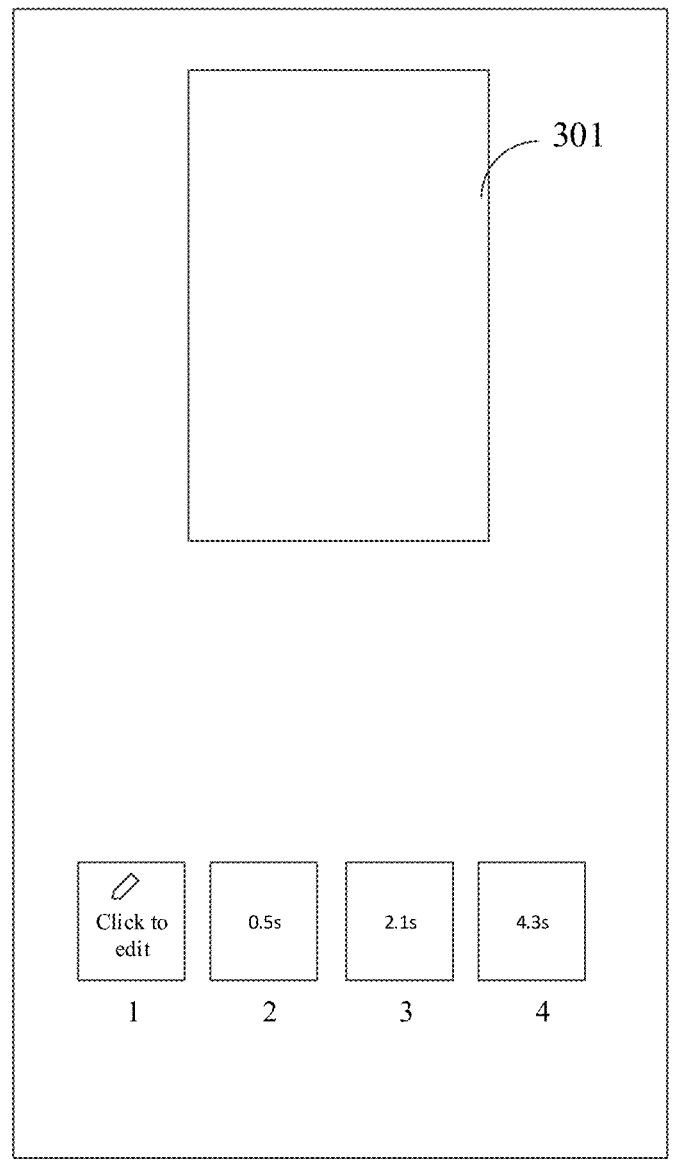
FIG. 6b is a first schematic diagram of a template editing page provided in an embodiment of the present disclosure.

Exemplarily, as shown in FIG. 6a, on the basis of FIG. 3b, after a preview effect is generated, a play button (not shown) may be clicked, and then the target video track clip is started to be played in the preview area 301. After a template cover 3 (on the right side of a cover 2 and shown by a dashed box) is selected, the template cover 3 displays a "click to edit" entry in a template selected state; a template editing page is entered after the button is clicked (as shown in FIG. 6b); and after entering the template editing page, the target clip inserted into the template slot position may be automatically played in the preview area 301, it may be set by default that a locating video tab selects the first template slot position, the slot position may be located to the playback clip in following, and when it is played to a certain target clip, the "click to edit" entry is displayed at the slot position corresponding to the target clip.

Figure 6C:
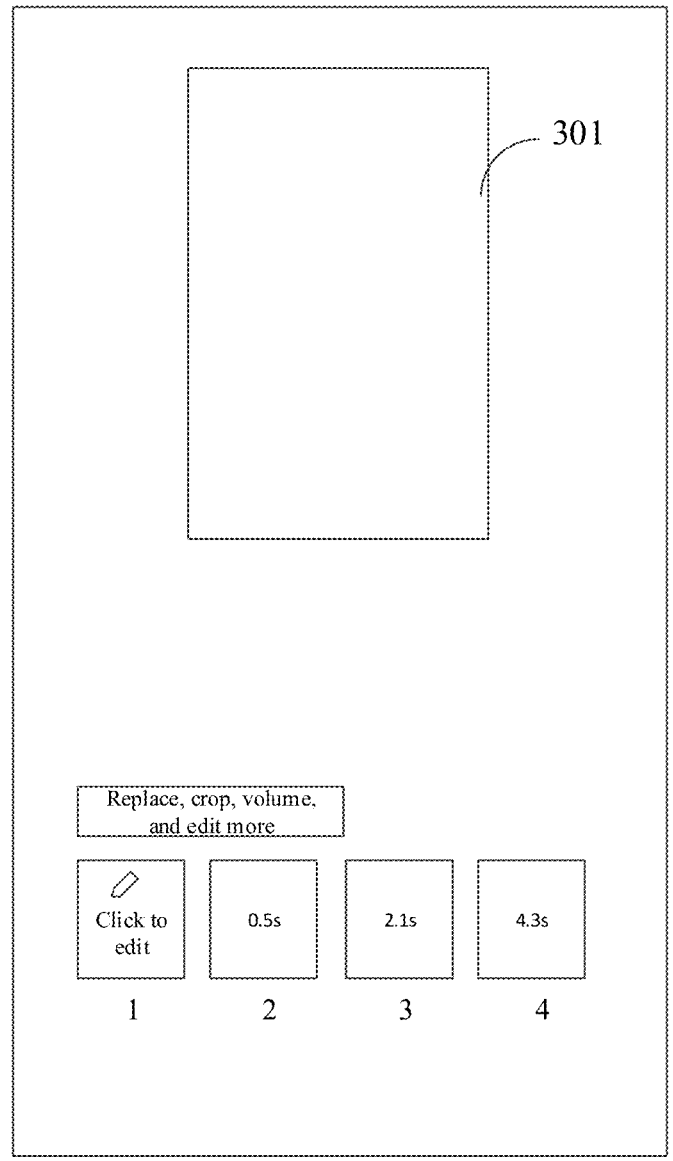
FIG. 6c is a second schematic diagram of a template editing page provided in an embodiment of the present disclosure.

In addition, the same color point marker may be set for clips at the template slot positions of the same category. During a specific editing process of the target clip at each template slot position, after the "click to edit" entry on a myself material slot position (a slot position in which the target clip is filled) as shown in FIG. 6b is clicked, as shown in FIG. 6c, editing options such as [replace], [crop], [volume] (a picture material has no volume), [edit more] and the like are shown. After a slot position that is not replaced with a myself material (a slot position in which the target clip is not filled) is clicked, only two options are displayed, that is, [replace] and [edit more]. After [replace] is clicked, an album import page may be pulled up, a video material of which the duration is greater than the duration of the slot position may be imported, a picture material may also be imported, and the material is filled in the template slot position after the material is clicked. When the replacement is confirmed, if different materials are imported for other clips of the same color, a pop-up window is popped up to query whether to replace the same together, and if [replace] is clicked, the other clips of the same color are replaced with the newly selected materials. [crop] is clicked to enter an editing page, a video display area may be selected by dragging, a video clip may also select the clip position and take effect after confirmation is clicked. [volume] is clicked to pull up a "clip initial sound volume" panel, the volume within a preset range (e.g., 0-100) may be adjusted by dragging, and √ is clicked for confirmation. [edit more] may be clicked to trigger a draft unlocking process.

During the process of editing a template text, the text is clicked in the editing page, a first-frame screenshot and copywriting content of a clip to which copywriting belongs are displayed in a time sequence, the copywriting is clicked for selection, a keyboard is pulled up if the copywriting is clicked again or if an edit icon on a text box is clicked, so as to display the copywriting content and a cursor animation, the copywriting may be modified/deleted, and the keyboard is folded by clicking √ for confirmation. In addition, it is also support to click characters in the preview area, so as to select the text, and deletion, edit and rotation identifier icons are displayed. If the text or the edit icon is clicked again, the keyboard is pulled up, and deletion and rotation icons are displayed on the screen. The position may be removed by pressing the text for a long time, the text may be amplified or rotated by pressing the rotation icon, and the keyboard is folded by clicking √ for confirmation, so as to locate to the text tab. The selection of the text is canceled if a non-text hotspot is clicked.

203: Presenting the target video track clip on the editing track.

Specifically, after being obtained, the target video track clip may be added into the editing track to be fused with the video material in the current initial video track clip, so as to obtain a video draft, and a template track corresponding to the target video track clip is generated to complete a track falling operation of the target video draft.

In one embodiment of the present disclosure, presenting the target video track clip on the editing track may include: determining a display position of the target video track clip in the editing track, and presenting the target video track clip at the display position.

Specifically, the target video track clip may be displayed at any position of the editing track. For example, the target video track clip may be added into different positions in the initial video track clip, so as to form different audio-visual effects. Therefore, the display position can be determined according to needs at first, and then the target video track clip is inserted into the display position, that is, the target video track clip is fused into the video material in the current initial video track clip. In addition, considering that if the target video draft is obtained by filling the target clip in the template slot position by using an automatic insertion strategy, the result obtained by the automatic pre-filling mode cannot completely reach the expectation of the user, and thus the user needs to perform editing and modification, so that after the target video track clip is inserted into the display position, the same clip as the target clip in the target video track clip can be reserved in the initial video track clip, so as to be manually deleted by the user after the user completes editing and modification.

In one embodiment of the present disclosure, determining the display position of the target video track clip in the editing track may include: determining the display position of the target video track clip in the editing track according to the position where the pointer in the editing track is located.

Specifically, in order to conveniently and quickly determine the display position, the display position may be determined based on the position where the pointer (the preview axis) in the editing track is located. For example, a clip segmentation point in the initial video track clip before or after the position where the pointer is located may be determined as the display position (for example, the pointer is located on a clip 3, then the clip segmentation point between a clip 2 and the clip 3 or a clip segmentation point between the clip 3 and a clip 4 may be determined as the display position), and the position where the pointer is located may also be directly determined as the display position, that is, if the pointer is located on a clip between two adjacent segmentation points, then the position where the pointer is located is segmented, the target video track clip is inserted at the segmentation position, for example, the pointer is located at a position M on the clip 3, then the position M may be cropped to obtain a segmentation point of the position M, and the segmentation point is determined as the display position.

In one embodiment of the present disclosure, determining the display position of the target video track clip in the editing track according to the position where the pointer in the editing track is located may include: determining a clip segmentation point closest to the position where the pointer is located as the display position of the target video track clip in the initial video track clip. Exemplarily, if the pointer is located at the position M on the clip 3, then a first distance from a first clip segmentation point between the clip 2 and the clip 3 to the position M may be determined, a second distance from a second clip segmentation point between the clip 3 and the clip 4 to the position M may be determined, the first distance is compared with the second distance, and the clip segmentation point corresponding to the smaller distance is determined as the display position.

In one embodiment of the present disclosure, presenting the target video track clip at the display position may include: presenting the target video track clip at the display position, and deleting, from the initial video track clip, the initial video material the same as that in the target video track clip.

Specifically, in order to improve the processing efficiency, since the target clip filled in the target video draft is also present in the current track material, the repeated clip may be deleted when the target video track clip is added into the editing track. Certainly, considering whether the target video draft meets a satisfaction degree of the user, after the user confirms to be satisfactory with the target video draft, one-key deletion may be performed; or, when the target video draft is added into the initial video track clip, after the repeated clip is deleted, the repeated clip is reserved in a storage space, and if it is found that the current target video draft cannot meet the user requirement, the repeated clip reserved in the storage space may be restored.

In one embodiment of the present disclosure, after step 203, the method may further include: in response to a touch operation acting on a second entry label in the video editing interface, displaying a template editing interface corresponding to the target video track clip, wherein the template editing interface includes at least one operation option; and performing an editing operation on the target video track clip according to the at least one operation option, so as to obtain an edited target track editing clip.

Specifically, after the target video track clip is added into the editing track, the template track in the video editing interface is selected, a plurality of operation options may be displayed, and based on the operation options, related operations may be performed on the target video draft into which the initial video track clip is added, for example, replacing the template, editing, unlocking the draft, deleting, volume, etc.

In one embodiment of the present disclosure, the operation option includes a template replacement option; and performing the editing operation on the target video track clip according to the at least one operation option, so as to obtain the edited target track editing clip, may include: in response to a touch operation acting on a function label corresponding to the template replacement option, displaying a template panel, wherein the template panel includes a plurality of templates to be replaced; and in response to a touch operation acting on the plurality of templates to be replaced, selecting a target replacement template, and filling the initial video material in the target replacement template, so as to obtain an edited target video track clip.

Exemplarily, the track falling mode of the target video draft and an editing operation after rail falling are exemplarily described below in combination with FIG. 7.

In a specific implementation process, the top left corner of the template editing page (as shown in FIG. 6b) is clicked to return (not shown) to an editing project (as shown in FIG. 6a), √ is clicked on the template panel to fold the template, meanwhile the generated target video draft is inserted into a segmentation point closer to the preview axis, and the target clip filled in the template is reserved and is automatically moved backwards.

Figure 7:
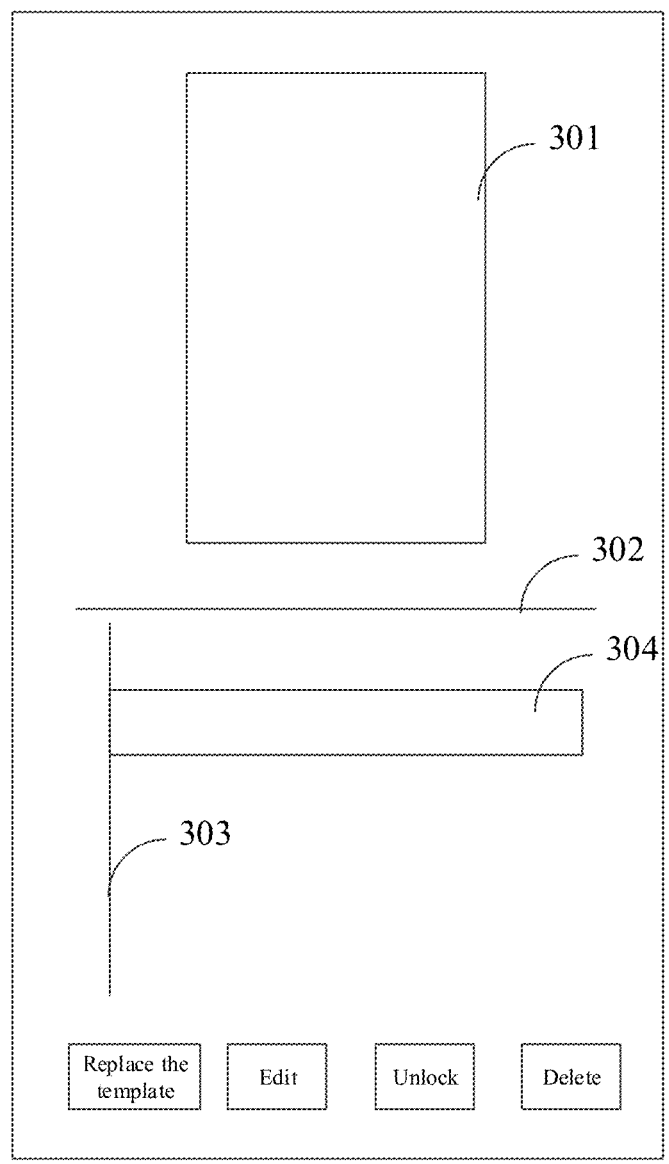
FIG. 7 is a schematic diagram of a template track corresponding to an editing page provided in an embodiment of the present disclosure.

After the template track is selected in the interface as shown in FIG. 3a, as shown in FIG. 7, [replace the template], [edit], [unlock], [delete] and [volume] are displayed in a bottom tool bar. [replace the template] is clicked to pull up the template panel, a material package tab is not displayed, the template cover is clicked to automatically fill the material selected in the initial template, a preview is generated, and the template cover is clicked again to enter the template editing page; √ on the template panel is clicked for confirmation, and the old template is replaced with a new template for track falling, and other tracks (character/sticker/audio/special effect, and the like) under the initial template track remain unchanged. [edit] is clicked to enter the template editing page. [unlock] is clicked to enter a draft unlocking process. If [delete] is clicked, the template track and the other editing tracks (character/sticker/audio/special effect, and the like) under the initial template track are deleted in linkage. [volume] is clicked to pull up a volume adjustment panel, a slide bar within a preset range (e.g., 0-100) is supported, and the volume of the entire template track may be adjusted.

In one embodiment of the present disclosure, different scenarios have different revocation and redo logic.

Specifically, for the addition/replacement of a template: the template is selected on the template panel and is clicked for editing, the template panel is returned after entering the editing page, and after √ is clicked to confirm track falling of the template, a complete operation is completed. After the track falling of the template is completed, revocation is clicked to delete the template, and "revoke: add a new template" is prompted; and if redo is clicked, the template is recovered, and "recover: add a new template" is prompted. For the editing of the template after track falling: the template track is selected, a menu bar is clicked for editing, and the main project is returned after entering the editing page. Revocation is clicked to recover to the state prior to editing, the template is still present, and "revoke: template editing" is prompted; and if redo is clicked, the template editing is recovered, and "recover: template editing" is prompted. After the template is unlocked, if revocation is clicked, the template is recovered to a composite clip, and "revoke: template unlocking" is prompted; and if redo is clicked, the template is scattered, and "recover: template unlocking" is prompted. After the template is deleted, if revocation is clicked, the template is recovered, and "revoke: deletion" is prompted; and if redo is clicked, the template is deleted, and "recover: deletion" is prompted. For the adjustment of the volume of the template: √ is clicked for confirmation, if revocation is clicked, the volume is recovered to a volume prior to adjustment, and "volume: xx (volume prior to adjustment)" is prompted; and if redo is clicked, the volume is adjusted, and "volume: xx (adjusted volume prior)" is prompted. For an independent editing page of the template: graying is performed every time entering the revocation and redo operations, the revocation may be clicked only after the editing operation is completed, and the logic and copywriting of revocation and redo are consistent with same-style clipping.

In one embodiment of the present disclosure, template search may be performed by inputting a keyword in a search box in the template panel. Specifically, the search box is clicked to automatically pulls up the keyboard, a cursor animation is displayed in the search box, a cancel button is clicked to return to the template panel, after content is input in the input box, X is displayed on the right side, the input content and a search result may be cleared by clicking X, an associated word is displayed during the input process of the input box, and a character consistent with the input content in the associated word may be highlighted; the associated word is clicked to automatically fill the associated word in the input box, and the search is started; and after the content is input, [search] is displayed at the lower right corner of the keyboard, search is triggered after [search] is clicked, and a loading state may be set in the search process. The search result is set to support screening: default sorting, material type, the number of clips, template duration, material proportion, category; if [reset] is clicked, and only [default sorting] is selected, the selection of other screening options is canceled; [confirm] is clicked to enter the loading state to start screening, and a screening button becomes into a selected state. When there is no search result, a prompt message may be displayed, for example, "there is no matching template, change a search word".

As can be seen from the above description, by means of determining the video draft template on the video editing interface, and applying the video draft template to the video material in the initial video track clip, a same-style clipping operation can be conveniently performed in the video editing interface without importing and exporting between the two tools of clipping and same-style clipping, so that the operation is simple, the video processing efficiency can be improved, and the user experience is thus improved.

Figure 8:
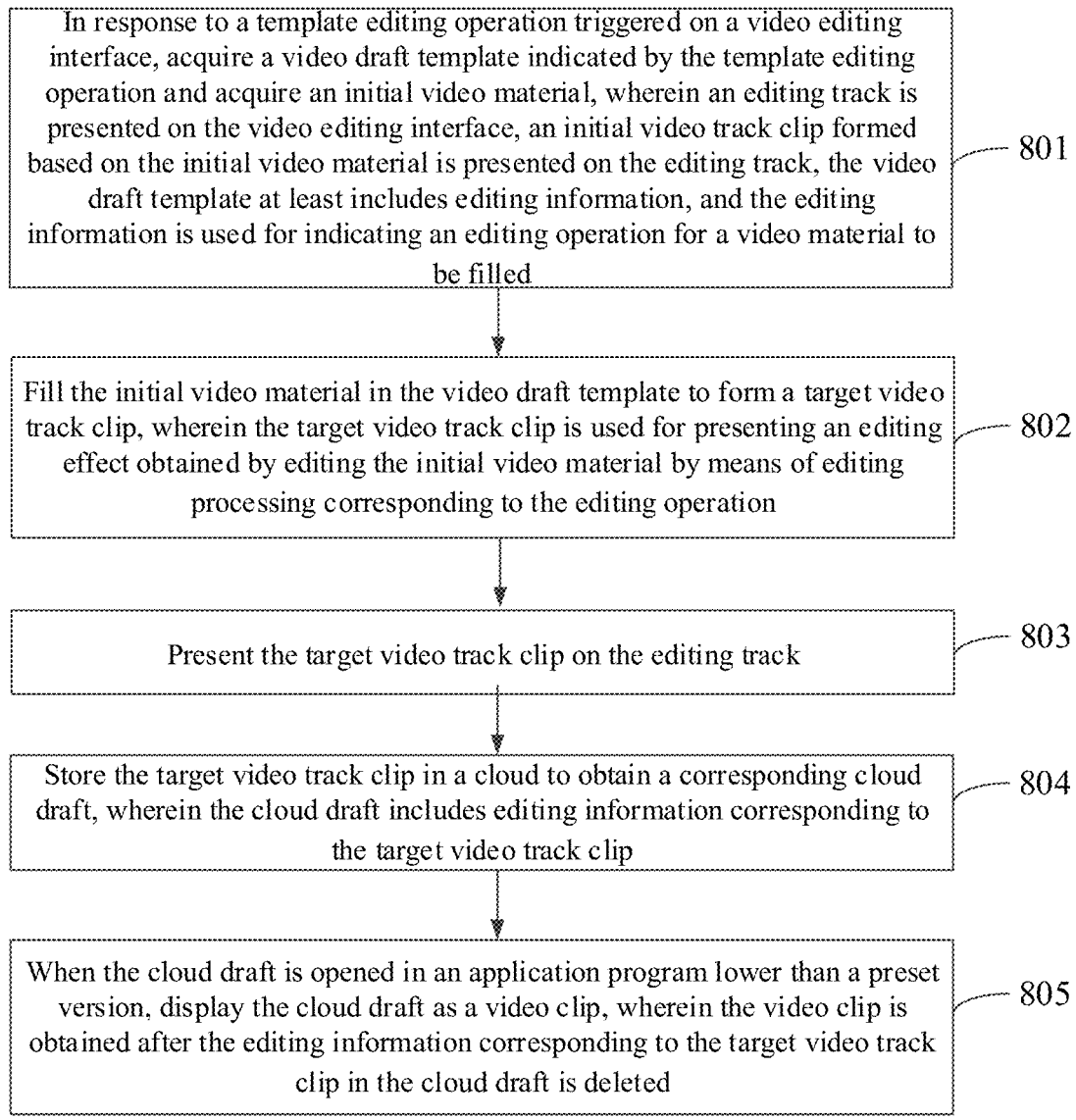
FIG. 8 is a second schematic flowchart of a video processing method provided in an embodiment of the present disclosure.

Referring to FIG. 8, FIG. 8 is a second schematic flowchart of a video processing method provided in an embodiment of the present disclosure. In the present embodiment, a synchronization mode when a video draft generated by a high-version application program is opened in a low-version application program is described in detail, and the video processing method includes:

801: In response to a template editing operation triggered on a video editing interface, acquiring a video draft template indicated by the template editing operation, and acquiring an initial video material, wherein an editing track is presented on the video editing interface, an initial video track clip formed based on the initial video material is presented on the editing track, the video draft template at least includes editing information, and the editing information is used for indicating an editing operation for a video material to be filled.

802: Filling the initial video material in the video draft template to form a target video track clip, wherein the target video track clip is used for presenting an editing effect obtained by editing the initial video material by applying editing processing corresponding to the editing operation to the initial video.

803: Presenting the target video track clip on the editing track.

Steps 801 to 803 in the embodiment of the present disclosure are similar to steps 201 to 203 in the foregoing embodiment, and thus details are not described herein again.

804: Storing the target video track clip in a cloud to obtain a corresponding cloud draft, wherein the cloud draft includes editing information corresponding to the target video track clip.

805: When the cloud draft is opened in an application program lower than a preset version, displaying the cloud draft as a video clip, wherein the video clip is obtained after the editing information corresponding to the target video track clip in the cloud draft is deleted.

Specifically, in order to edit the video draft on different devices, the video draft may be stored in a cloud space, so that the cloud space may be accessed on different devices (such as a computer, a mobile phone and a tablet) to obtain the video draft, and then the video draft is further processed. However, in the case that the hardware configurations of the different devices are different or the versions of the client application programs are different, when the cloud draft is opened in the low-version application program, some functions are not supported, with regard to the cloud draft containing the target video track clip, when the cloud draft is opened in the low-version application program, operation information corresponding to the target video track clip, that is, the editing information of the template track, cannot be supported, so that the operation information about the target video track clip in the cloud draft can be deleted to obtain a video clip corresponding to the cloud draft, that is, a composite clip.

Exemplarily, the following strategy may be utilized for low-version cloud synchronization: for a template clip containing a non-unlocked template in the draft, the cloud draft is uploaded, then the draft is downloaded in a low version, and the template clip is displayed as a composite clip, wherein the clip that is not replaced with the myself material (the target clip) may be provided with a watermark; for a clip that is not replaced with the myself material in the unlocked template, the draft is synchronously opened in the low version on the cloud, and the draft may also be provided with a watermark; and for a draft containing the target video track clip, that is, the draft containing same-type clipping(template & unlocking draft) may be set as a version which is not allowed to be degraded to a version that does not support the composite clip, and the draft may be guided for upgrading during downloading. For example, the following pop-up window copywriting may be utilized: title: the software version needs to be upgraded; main body: the draft version is relatively new, and the draft may be opened after upgrading to the latest version; interaction: bottom button [immediate update]; and it is supported to click the pop-up window to close the same.

As can be seen from the above description, in order to realize cloud synchronization, when the cloud draft is opened in the low-version application program, the target video track clip can be displayed as the composite clip, so that the user can conveniently check or edit the cloud draft on different devices.

Figure 9:
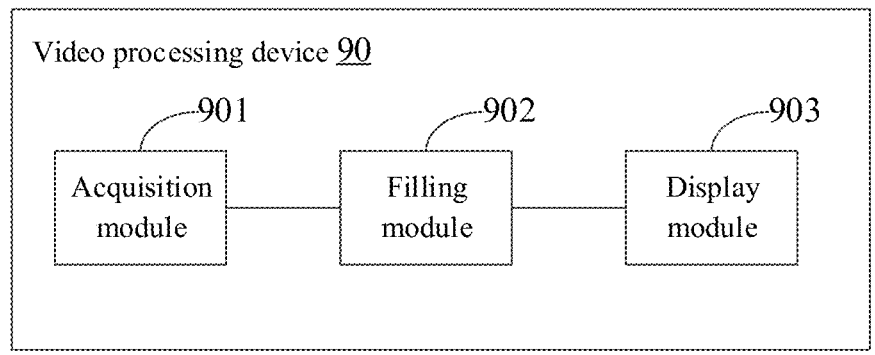
FIG. 9 is a structural block diagram of a video processing device provided in an embodiment of the present disclosure.

Corresponding to the video processing method in the forgoing embodiments, FIG. 9 is a structural block diagram of a video processing device provided in an embodiment of the present disclosure. For ease of description, only parts related to the embodiments of the present disclosure are shown. Referring to FIG. 9, the device 90 includes an acquisition module 901, a filling module 902, and a display module 903.

The acquisition module 901 is configured to: in response to a template editing operation triggered on a video editing interface, acquire a video draft template indicated by the template editing operation and acquire an initial video material, wherein an editing track is presented on the video editing interface, an initial video track clip formed based on the initial video material is presented on the editing track, the video draft template at least includes editing information, and the editing information is used for indicating an editing operation for a video material to be filled.

The filling module 902 is configured to fill the initial video material in the video draft template to form a target video track clip, wherein the target video track clip is used for presenting an editing effect obtained by editing the initial video material by applying editing processing corresponding to the editing operation to the initial video.

The display module 903 is configured to present the target video track clip on the editing track.

In one embodiment of the present disclosure, the acquisition module 901 is specifically configured to: in response to a touch operation acting on a first entry label in the video editing interface, display a template panel, wherein the template panel includes a plurality of templates to be selected; and in response to a touch operation acting on the plurality of templates to be selected, select the video draft template from the plurality of templates to be selected.

In one embodiment of the present disclosure, the filling module 902 is specifically configured to: fill the initial video material in the video draft template to obtain a target video draft, wherein the target video draft includes editing operation information of the initial video material; and form the target video track clip based on the target video draft.

In one embodiment of the present disclosure, the filling module 902 is specifically configured to: fill the target video draft to obtain the target video track clip; or, perform synthesis processing on the target video draft to obtain a corresponding target video material, and fill the target video material to obtain the target video track clip.

In one embodiment of the present disclosure, the filling module 902 is specifically configured to: acquire the position where a pointer in the editing track is located; determine at least one target clip from the initial video material according to the position where the pointer is located; and fill the at least one target clip in the video draft template to obtain the target video draft.

In one embodiment of the present disclosure, the filling module 902 is specifically configured to: determine, as target clips, a clip corresponding to the position where the pointer is located in the initial video material, as well as a subsequent clip.

In one embodiment of the present disclosure, the filling module 902 is specifically configured to: insert the at least one target clip into at least one template slot position of the video draft template in a one-to-one correspondence mode according to the sequence of the at least one target clip in the initial video track clip and the sequence of the at least one template slot position in the video draft template.

In one embodiment of the present disclosure, the filling module 902 is specifically configured to: if the current target clip to be processed meets a preset condition corresponding to the current template slot position to be inserted, insert the current target clip to be processed into the current template slot position to be inserted; and if the current target clip to be processed does not meet the preset condition corresponding to the current template slot position to be inserted, and there is a next target clip to be processed, determine the next target clip to be processed as a new current target clip to be processed.

In one embodiment of the present disclosure, the filling module 902 is specifically configured to: acquire a first duration of the current target clip to be processed and a second duration of the current template slot position to be inserted; and if the first duration is greater than or equal to the second duration, insert the current target clip to be processed into the current template slot position to be inserted; and correspondingly, the step: if the current target clip to be processed does not meet the preset condition corresponding to the current template slot position to be inserted, and there is the next target clip to be processed, determining the next target clip to be processed as the new current target clip to be processed, includes: if the first duration is less than the second duration, and there is the next target clip to be processed, determining the next target clip to be processed as the new current target clip to be processed.

In one embodiment of the present disclosure, the filling module 902 is specifically configured to: if there is no next template slot position to be inserted, determine the target video draft according to the at least one template slot position of which the insertion is completed.

In one embodiment of the present disclosure, the filling module 902 is specifically configured to: if the current target clip to be processed does not meet the preset condition corresponding to the current template slot position to be inserted, and there is no next target clip to be processed, fill preset pictures in the current template slot position to be inserted and the remaining template slot positions to be inserted.

In one embodiment of the present disclosure, the display module 903 is specifically configured to: determine a display position of the target video track clip in the editing track, and present the target video track clip at the display position.

In one embodiment of the present disclosure, the display module 903 is specifically configured to: determine the display position of the target video track clip in the editing track according to the position where the pointer in the editing track is located.

In one embodiment of the present disclosure, the display module 903 is specifically configured to: determine a clip segmentation point closest to the position where the pointer is located as the display position of the target video track clip in the initial video track clip.

In one embodiment of the present disclosure, the display module 903 is specifically configured to: present the target video track clip at the display position, and delete, from the initial video track clip, the initial video material the same as that in the target video track clip.

In one embodiment of the present disclosure, the device 90 further includes an editing module (not shown), wherein the editing module is configured to: add the target video draft into the initial video track clip to obtain a target material; in response to a touch operation acting on a second entry label in the video editing interface, display a template editing interface corresponding to the target video track clip, wherein the template editing interface includes at least one operation option; and perform an editing operation on the target video track clip according to the at least one operation option, so as to obtain an edited target track editing clip.

In one embodiment of the present disclosure, the editing module is specifically configured to: in response to a touch operation acting on a function label corresponding to a template replacement option, display a template panel, wherein the template panel includes a plurality of templates to be replaced; and in response to a touch operation acting on the plurality of templates to be replaced, select a target replacement template, and fill the initial video material in the target replacement template, so as to obtain an edited target video track clip.

In one embodiment of the present disclosure, the device 90 further includes a cloud synchronization module (not shown), wherein the cloud synchronization module is configured to: store the target video track clip in a cloud to obtain a corresponding cloud draft, wherein the cloud draft includes editing information corresponding to the target video track clip; and when the cloud draft is opened in an application program lower than a preset version, display the cloud draft as a video clip, wherein the video clip is obtained after the editing information corresponding to the target video track clip in the cloud draft is deleted.

The device provided in the present embodiment may be used for executing the technical solutions of the foregoing method embodiments, and the implementation principles and technical effects thereof are similar, thus details are not described herein again in the present embodiment.

In order to implement the above embodiments, an embodiment of the present disclosure further provides an electronic device.

Figure 10:
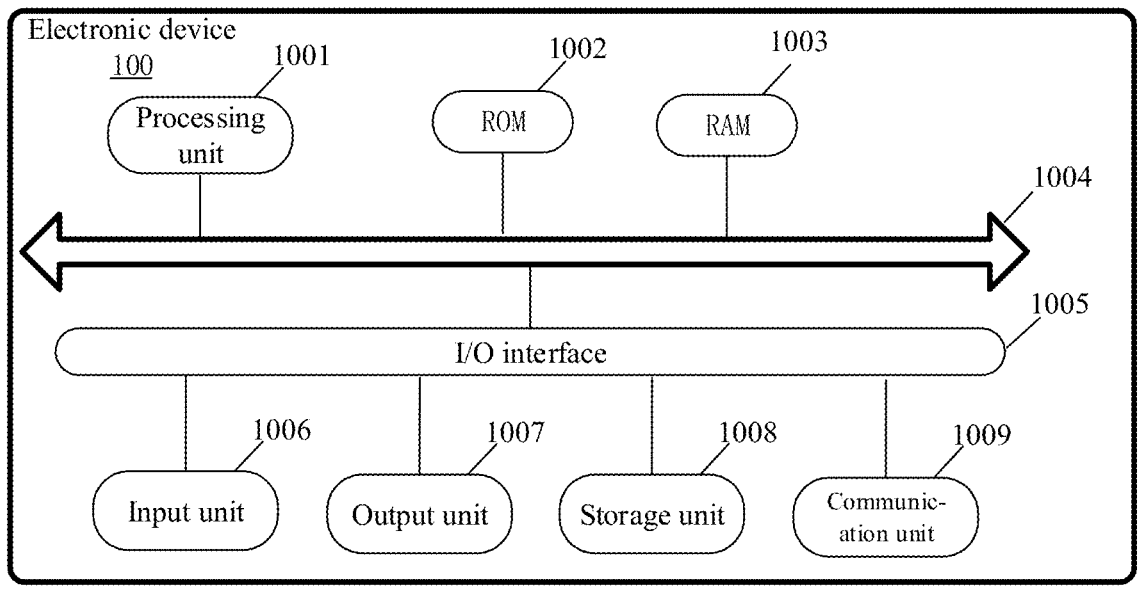
FIG. 10 is a schematic diagram of a hardware structure of an electronic device provided in an embodiment of the present disclosure.

Referring to FIG. 10, it illustrates a schematic structural diagram of an electronic device 100 suitable for implementing the embodiments of the present disclosure. The electronic device 100 may be a terminal device or a server. The terminal device may include, but is not limited to, mobile terminals such as mobile phones, notebook computers, digital broadcast receivers, personal digital assistants (PDAs for short), portable Android devices (PADs for short), portable media players (PMPs for short), vehicle-mounted terminals (e.g., vehicle-mounted navigation terminals), and the like, and fixed terminals such as digital TVs, desktop computers, and the like. The electronic device shown in FIG. 10 is merely an example, and should not bring any limitation to the functions and use ranges of the embodiments of the present disclosure.

As shown in FIG. 10, the electronic device 100 may include a processing unit (e.g., a central processing unit, a graphics processing unit, or the like) 1001, which may perform various suitable actions and processes in accordance with a program stored in a read only memory (ROM for short) 1002 or a program loaded from a storage unit 1008 into a random access memory (RAM for short) 1003. In the RAM 1003, various programs and data needed by the operations of the electronic device 100 are also stored. The processing unit 1001, the ROM 1002 and the RAM 1003 are connected to each other via a bus 1004. An input/output (I/O) interface 1005 is also connected to the bus 1004.

In general, the following units may be connected to the I/O interface 1005: an input unit 1006, including, for example, a touch screen, a touch pad, a keyboard, a mouse, a camera, a microphone, an accelerometer, a gyroscope, and the like; an output unit 1007, including, for example, a liquid crystal display (LCD for short), a speaker, a vibrator, and the like; a storage unit 1008, including, for example, a magnetic tape, a hard disk, and the like; and a communication unit 1009. The communication unit 1009 may allow the electronic device 100 to communicate in a wireless or wired manner with other devices to exchange data. While FIG. 10 illustrates the electronic device 100 having various units, it is to be understood that not all illustrated units are required to be implemented or provided. More or fewer units may alternatively be implemented or provided.

In particular, according to the embodiments of the present disclosure, the processes described above with reference to flowcharts may be implemented as computer software programs. For example, the embodiments of the present disclosure include a computer program product, which includes a computer program carried on a computer-readable medium, and the computer program contains program codes for performing the method illustrated in the flowcharts. In such embodiments, the computer program may be downloaded and installed from a network via the communication unit 1009, or installed from the storage unit 1008, or installed from the ROM 1002. When the computer program is executed by the processing unit 1001, the above functions defined in the method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is included in a baseband or is propagated as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

The computer-readable medium may be contained in the above electronic device; and it may also be present separately and is not assembled into the electronic device.

The computer-readable medium carries one or more programs that, when executed by the electronic device, cause the electronic device to execute the method shown in the above embodiments.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN for short) or a wide area network (WAN for short), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions noted in the block may occur out of the order noted in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, a first acquisition unit may also be described as "a unit for acquiring at least two Internet Protocol addresses".

The functions described herein above may be performed, at least in part, by one or more hardware logic components. For example, without limitation, example types of the hardware logic components that may be used include: field programmable gate arrays (FPGAs), application-specific integrated circuits (ASICs), application-specific standard products (ASSPs), system on chips (SOCs), complex programmable logic devices (CPLDs), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

What have been described above are only preferred embodiments of the present disclosure and illustrations of the technical principles employed. It will be appreciated by those skilled in the art that the disclosure scope involved herein is not limited to the technical solutions formed by specific combinations of the above technical features, and meanwhile should also encompass other technical solutions formed by any combinations of the above technical features or equivalent features thereof, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it is to be understood that the theme defined in the appended claims is not necessarily limited to the specific features or actions described above. Rather, the specific features and actions described above are merely example forms of implementing the claims.

I claim:

1. A video processing method, comprising:
in response to a template editing operation triggered on a video editing interface, acquiring a video draft template indicated by the template editing operation and acquiring an initial video material, wherein an editing track is presented on the video editing interface, an initial video track clip formed based on the initial video material is presented on the editing track, the video draft template at least comprises editing information, and the editing information is used for indicating an editing operation for a video material to be filled;
filling the initial video material in the video draft template to form a target video track clip, wherein the target video track clip is used for presenting an editing effect obtained by editing the initial video material by applying editing processing corresponding to the editing operation to the initial video; and
presenting the target video track clip on the editing track, comprising, determining a display position of the target video track clip in the editing track, and presenting the target video track clip at the display position,
wherein presenting the target video track clip at the display position comprises: presenting the target video track clip at the display position, and deleting, from the initial video track clip, the initial video material the same as that in the target video track clip.

2. The method according to claim 1, wherein in response to the template editing operation triggered on the video editing interface, acquiring the video draft template indicated by the template editing operation, comprises:
in response to a touch operation acting on a first entry label in the video editing interface, displaying a template panel, wherein the template panel comprises a plurality of templates to be selected; and
in response to a touch operation acting on the plurality of templates to be selected, selecting the video draft template from the plurality of templates to be selected.

3. The method according to claim 1, wherein filling the initial video material in the video draft template to form the target video track clip comprises:
filling the initial video material in the video draft template to obtain a target video draft, wherein the target video draft comprises editing operation information of the initial video material; and
forming the target video track clip based on the target video draft.

4. The method according to claim 3, wherein forming the target video track clip based on the target video draft comprises:
filling the target video draft to obtain the target video track clip;
or,
performing synthesis processing on the target video draft to obtain a corresponding target video material, and filling the target video material to obtain the target video track clip.

5. The method according to claim 3, wherein filling the initial video material in the video draft template to obtain the target video draft comprises:
acquiring a position where a pointer in the editing track is located;
determining at least one target clip from the initial video material according to the position where the pointer is located; and
filling the at least one target clip in the video draft template to obtain the target video draft.

6. The method according to claim 5, wherein determining at least one target clip from the initial video material according to the position where the pointer is located comprises:
determining, as target clips, a clip corresponding to the position where the pointer is located in the initial video material, as well as a subsequent clip.

7. The method according to claim 5, wherein filling the at least one target clip in the video draft template comprises:
inserting the at least one target clip into at least one template slot position of the video draft template in a one-to-one correspondence mode according to the sequence of the at least one target clip in the initial video track clip and the sequence of the at least one template slot position in the video draft template, wherein the template slot position is used for indicating a fillable position of the video material to be filled in the video draft template.

8. The method according to claim 7, wherein inserting the at least one target clip into the at least one template slot position of the video draft template in the one-to-one correspondence mode according to the sequence of the at least one target clip in the initial video track clip and the sequence of the at least one template slot position in the video draft template, comprises:
in a case that the current target clip to be processed meets a preset condition corresponding to a current template slot position to be inserted, inserting the current target clip to be processed into the current template slot position to be inserted; and
in a case that the current target clip to be processed does not meet the preset condition corresponding to the current template slot position to be inserted, and there is a next target clip to be processed, determining the next target clip to be processed as a new current target clip to be processed.

9. The method according to claim 8, wherein in a case that the current target clip to be processed and the current template slot position to be inserted meet the preset condition, inserting the current target clip to be processed into the current template slot position to be inserted, comprises:

acquiring a first duration of the current target clip to be processed and a second duration of the current template slot position to be inserted; and in a case that the first duration is greater than or equal to the second duration, inserting the current target clip to be processed into the current template slot position to be inserted; and correspondingly, in a case that the current target clip to be processed does not meet the preset condition corresponding to the current template slot position to be inserted, and there is the next target clip to be processed, determining the next target clip to be processed as the new current target clip to be processed, comprises:

in a case that the first duration is less than the second duration, and there is the next target clip to be processed, determining the next target clip to be processed as the new current target clip to be processed.

10. The method according to claim 8, wherein after inserting the current target clip to be processed into the current template slot position to be inserted, the method further comprises:

in a case that there is no next template slot position to be inserted, determining the target video draft according to the at least one template slot position of which the insertion is completed.

11. The method according to claim 8, wherein inserting the at least one target clip into the at least one template slot position of the video draft template in the one-to-one correspondence mode according to the sequence of the at least one target clip in the initial video track clip and the sequence of the at least one template slot position in the video draft template, further comprises:

in a case that the current target clip to be processed does not meet the preset condition corresponding to the current template slot position to be inserted, and there is no next target clip to be processed, filling preset pictures in the current template slot position to be inserted and the remaining template slot positions to be inserted.

12. The method according to claim 1, wherein determining the display position of the target video track clip in the editing track comprises:

determining the display position of the target video track clip in the editing track according to a position where a pointer in the editing track is located.

13. The method according to claim 12, wherein determining the display position of the target video track clip in the editing track according to the position where the pointer in the editing track is located comprises:

determining a clip segmentation point closest to the position where the pointer is located as the display position of the target video track clip in the initial video track clip.

14. The method according to claim 1, wherein after presenting the target video track clip on the editing track, the method further comprises:

in response to a touch operation acting on a second entry label in the video editing interface, displaying a template editing interface corresponding to the target video track clip, wherein the template editing interface comprises at least one operation option; and performing an editing operation on the target video track clip according to the at least one operation option, so as to obtain an edited target track editing clip.

15. The method according to claim 14, wherein the operation option comprises a template replacement option; and performing the editing operation on the target video track clip according to the at least one operation option, so as to obtain the edited target track editing clip, comprises:

in response to a touch operation acting on a function label corresponding to the template replacement option, displaying a template panel, wherein the template panel comprises a plurality of templates to be replaced; and in response to a touch operation acting on the plurality of templates to be replaced, selecting a target replacement template, and filling the initial video material in the target replacement template, so as to obtain an edited target video track clip.

16. The method according to claim 1, wherein after presenting the target video track clip on the editing track, the method further comprises:

storing the target video track clip in a cloud to obtain a corresponding cloud draft, wherein the cloud draft comprises editing information corresponding to the target video track clip; and when the cloud draft is opened in an application program lower than a preset version, displaying the cloud draft as a video clip, wherein the video clip is obtained after the editing information corresponding to the target video track clip in the cloud draft is deleted.

17. An electronic device, comprising a processor; and a memory storing machine-executable instructions, wherein the machine-executable instructions, when executed by the processor, cause the processor to:

in response to a template editing operation triggered on a video editing interface, acquire a video draft template indicated by the template editing operation and acquiring an initial video material, wherein an editing track is presented on the video editing interface, an initial video track clip formed based on the initial video material is presented on the editing track, the video draft template at least comprises editing information, and the editing information is used for indicating an editing operation for a video material to be filled;

fill the initial video material in the video draft template to form a target video track clip, wherein the target video track clip is used for presenting an editing effect obtained by editing the initial video material by applying editing processing corresponding to the editing operation to the initial video; and present the target video track clip on the editing track by determining a display position of the target video track clip in the editing track, and presenting the target video track clip at the display position, wherein presenting the target video track clip at the display position comprises: presenting the target video track clip at the display position, and deleting, from the initial video track clip, the initial video material the same as that in the target video track clip.

18. A computer program product, tangibly stored on a non-transitory computer-readable medium and comprising computer-executable instructions, wherein the computer-executable instructions, when executed by a processor of a computer, cause the processor to:

in response to a template editing operation triggered on a video editing interface, acquire a video draft template indicated by the template editing operation and acquiring an initial video material, wherein an editing track is presented on the video editing interface, an initial video track clip formed based on the initial video material is presented on the editing track, the video draft template at least comprises editing information, and the editing information is used for indicating an editing operation for a video material to be filled;

fill the initial video material in the video draft template to form a target video track clip, wherein the target video track clip is used for presenting an editing effect obtained by editing the initial video material by applying editing processing corresponding to the editing operation to the initial video; and present the target video track clip on the editing track by determining a display position of the target video track clip in the editing track, and presenting the target video track clip at the display position, wherein presenting the target video track clip at the display position comprises: presenting the target video track clip at the display position, and deleting, from the initial video track clip, the initial video material the same as that in the target video track clip.

* * * * *